United States Patent [19]

Preston et al.

[11] 4,127,852

[45] Nov. 28, 1978

[54] POWER USE ALARM

[75] Inventors: Marvin W. Preston; Daymon G. Barton, both of El Dorado Springs, Mo.

[73] Assignee: R. & I.C. Alarms, Inc., El Dorado Springs, Mo.

[21] Appl. No.: 791,710

[22] Filed: Apr. 28, 1977

[51] Int. Cl.[2] .......................... H04B 7/00; H04Q 9/12; H04J 3/00

[52] U.S. Cl. .................................. 340/171 R; 325/64; 325/364

[58] Field of Search ............... 340/171 R, 164 R, 224, 340/171 PF; 325/308, 309, 37, 51, 53, 54, 55, 64, 392, 364, 466; 179/2 A, 2 E

[56] References Cited

U.S. PATENT DOCUMENTS

| | | | |
|---|---|---|---|
| 3,521,168 | 7/1970 | Kaiser et al. | 325/53 |
| 3,596,181 | 7/1971 | Dowling et al. | 325/55 |
| 3,723,876 | 3/1973 | Seaborn, Jr. | 325/64 |
| 3,803,491 | 4/1974 | Osborn | 340/171 PF |
| 3,860,913 | 1/1975 | Weeks, Jr., et al. | 340/171 PF |
| 3,949,401 | 4/1976 | Hegeler et al. | 340/171 R |
| 3,980,954 | 9/1976 | Whyte | 325/64 |
| 3,993,955 | 11/1976 | Belcher et al. | 325/392 |
| 4,021,615 | 5/1977 | James et al. | 179/2 A |

*Primary Examiner*—Donald J. Yusko
*Attorney, Agent, or Firm*—Head, Johnson & Chafin

[57] ABSTRACT

A power use peak load alarm system which is triggered by a specific combination of audio tones received by way of a fixed tuned AM or FM receiver located in the user's facility. The receiver is equipped with a filtering system to reduce the probability of false triggering. Upon receipt of the alarm signal, the alarm system goes into an alarm condition consisting of a visual alarm and an audio alarm. The visual alarm consists of a blinking alarm light while the audio alarm provides full output volume at the receiver for receipt of an alarm message or other audible alarm signal. The received alarm signal will initiate a timer circuit which will hold the receiver in an alarm condition for a preset time interval. During the alarm interval, certain relay contacts are made which may be connected to turn off non-essential electrical equipment or switch to a dual register/dual rate meter or both.

14 Claims, 5 Drawing Figures

POWER USE ALARM

BACKGROUND OF THE INVENTION

1. Field of the Invention

The present invention relates to an alarm system, and more particularly but not by way of limitation, to an electrical power peak load alarm system for notifying the user of a power use peak load alarm system for notifying the user of a power use peak load condition.

2. Description of the Prior Art

With the present energy crises, it becomes paramount that we constantly strive to find effective ways to reduce power consumption while maintaining a good standard of life. Further, with our rapidly advancing electronic technology, electrical power consumption is becoming an increasing problem in the area of distribution alone.

The entire country is connected into a vast and complicated network of cooperative power distribution facilities whereby power is constantly being transferred from one location to another in an attempt to meet the demand wherever it occurs.

However, it has become apparent that there are peak load times that occur during the day which vary throughout the seasons and with weather extremities during those seasons. When these peak load times occur, power distribution becomes critical and can easily result in power blackouts over wide areas of the country, the results of which are far reaching.

Further, since many power distributors charge more for power during peak load seasons, it would be expedient to reduce power consumption during peak load conditions.

The most positive steps taken so far to induce users to use less power during peak load seasons, is to increase the cost of power throughout that season. However, this can result in unfair penalties to the conservative user and is in reality justified only during peak load times during the day.

SUMMARY OF THE PRESENT INVENTION

The present invention provides a peak load alarm system which can be installed in a user's home to provide a warning to the user when a peak load situation exists.

This system was arrived at with the thought that an educated and informed consumer will voluntarily participate in reducing peak load usages if he or she is warned of when the peak load situation occurs. However, the system contains the flexibility of being able, upon the receipt of an alarm signal, to either switch to a dual rate meter during the peak load condition or to automatically switch off nonessential electrical equipment such as air conditioners, auxiliary lighting and the like.

The system comprises a radio receiver which may be tuned to either AM or FM and which is fixed tuned to a cooperating local braodcast station. While the reciever will at all times be on, the user may adjust the volume to any desired level including all the way down so that no sound is perceptible.

When a peak load condition is approaching, the power distributor informs the cooperating broadcast station of the peak load usage condition. The broadcast station then transmits a prerecorded message preceded by a specific combination of audio tones for the intended area of coverage.

Upon receiving the correct tones, through a filtering system in the receiver to prevent false triggering, the receiver will be triggered to provide both audible and visual alarms at the receiver. The visual alarm amounts to a flashing light signal while simultaneously with the visual alarm, the triggering device bypasses the receiver volume control and switches to full speaker volume for the receipt of a prerecorded message or other audible alarm signal.

Also, when the code tones are verified in the receiver, a timer device in the receiver is initiated for a preset duration of time to coincide with the typical duration of such peak load conditions. This peak load duration may range from a few minutes in some areas to several hours in others.

While the timer is running, the receiver is latched into an alarm mode and the visual alarm will continue throughout the interval. The user will be able to reset the speaker volume but the receiver will remain in the alarm mode.

Upon initiation of the timer, a set of external relay contacts are activated. These contacts may serve to automatically activate a dual rate meter which acts as an inducement for the user to reduce power consumption. The contacts, on the other hand, may be directly connected into the user's power circuitry so that during the alarm mode, power is automatically removed from nonessential electrical equipment in the user's home or factory.

At the end of the timed cycle, the receiver is automatically reset to a standard mode of operation and is ready to receive the next peak load alarm signal.

The present invention provides a system designed to reduce consumer power usages during peak load use times. The system is simple, efficient and constitutes a fair and equitable means to control the power usage only when such control is absolutely necessary.

DESCRIPTION OF THE DRAWINGS

Other and further advantageous features of the present invention will hereinafter more fully appear in connection with a detailed description of the drawings, in which.

DESCRIPTION OF THE PREFERRED EMBODIMENT

Figure 1:
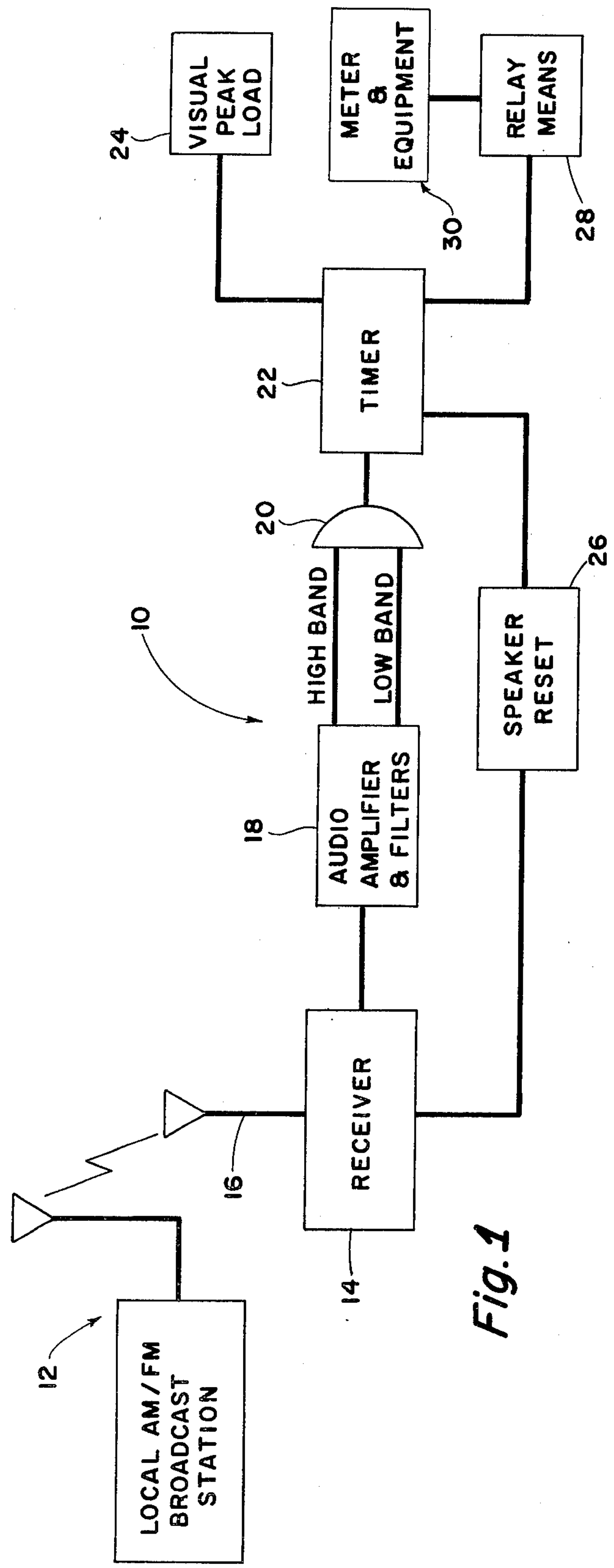
FIG. 1 is a schematic block diagram of an alarm system embodying the present invention.

Referring to the drawings in detail and particularly FIG. 1, reference character 10 generally indicates a power use peak load alarm system utilized in conjunction with a cooperating local AM or FM broadcast station generally indicated by reference character 12. The alarm system 10 generally comprises a receiver 14 and associated receiving antenna 16 for receiving a coded alarm signal from the broadcast station 12. The system also comprises a state variable active filter 18, with an audio amplifier on its input. The high band tone is filtered through HP (high pass) section and is presented to a PLL (phase lock loop) detector 20. Likewise the low band tone is filtered through LP (low pass) section and is presented to a PLL detector 20. For added security both tones need to be present to ensure a suitable output of tone decoder 20 to initiate a fired time duration timer 22. The output of the timer 22 is connected to a visual alarm display 24, an audible alarm in conjunction with the receiver 14 through a speaker reset function 26 and a relay unit 28. The relay unit 28 is provided with a plurality of contacts which can be utilized to vary the power usage equipment and/or rate metering generally indicated by reference character 30.

Figure 2:
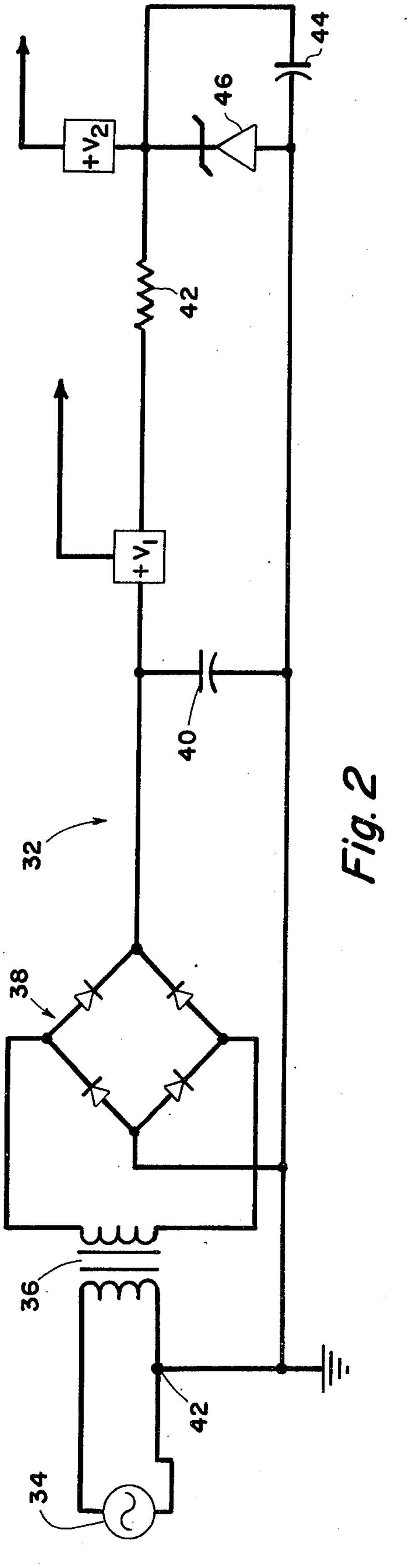
FIG. 2 is a schematic diagram of a power supply for the receiver portion of the system of FIG. 1.

Referring now to FIG. 2 reference character 32 generally indicates a power supply for the system which is operably connected to the user3 s AC power source indicated by reference character 34. This AC source may be ordinary 110 volt 60 cycle house power. The AC power is stepped down to an appropriate voltage level by the transformer 36 and then passed through a full wave rectifier generally indicated by reference character 38. The output of the rectifier 38 is filtered by a capacitor 40 and the ground thereof is made common with the ground for the AC power source 34 by the connection 42. The positive side of the output of the rectifier 38 is connected to one side of a resistor 42 which is tied to the ground through a second capacitor 44. Between the resistor 42 and the full way rectifier 38 is a first voltage takeoff + V1. A second voltage take off + V2 is attached to the positive side of the circuit between the resistor 42 and the capacitor 44. A controlled rectifier or zener diode or the like 46 is operably connected between the resistor 42 and the capacitor 44 with the negative side thereof being attached to ground. The power supply 32 therefore provides two controlled positive DC output voltages + V1 and + V2 as clearly shown in FIG. 2.

Figure 5:
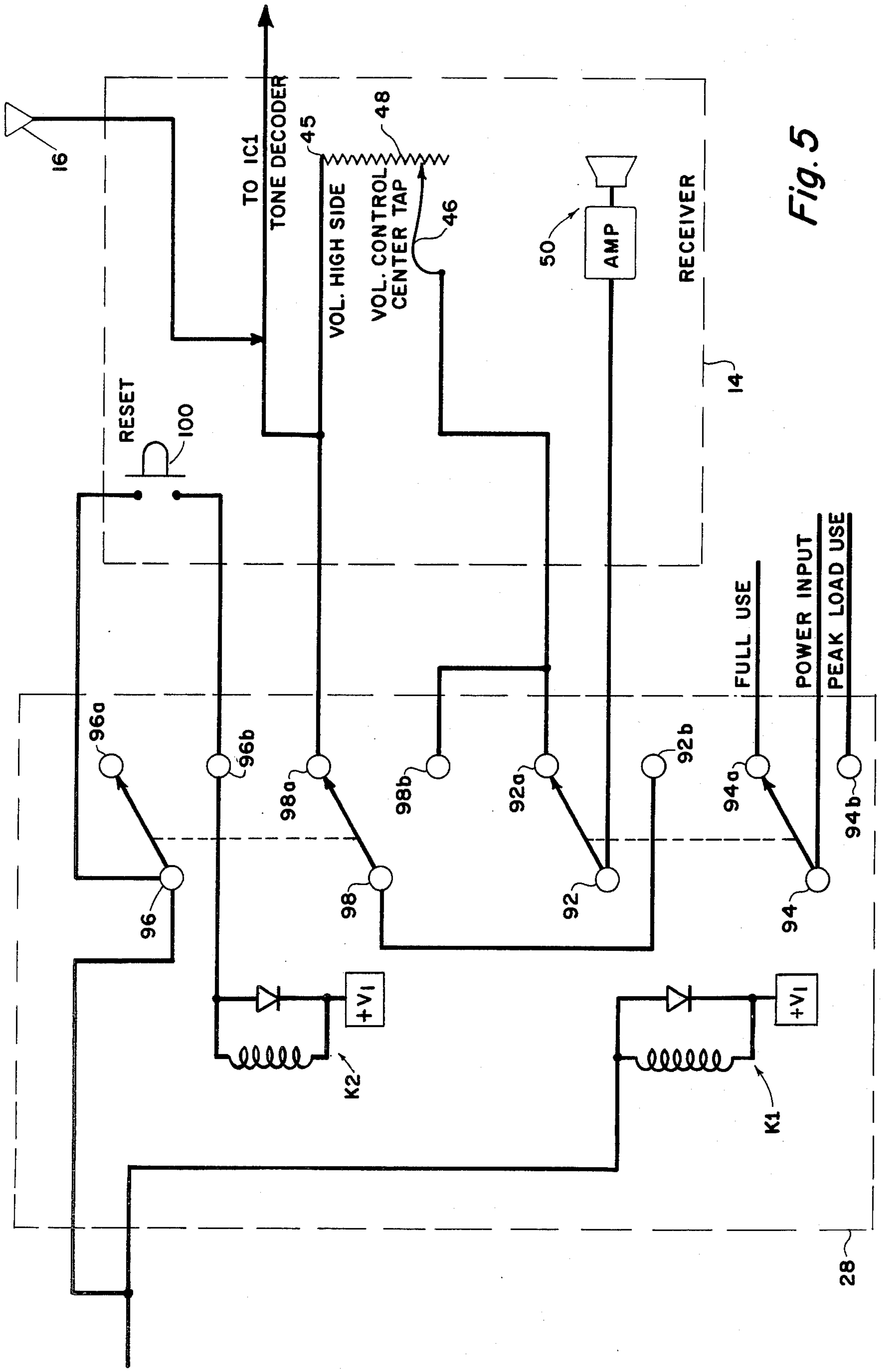
FIG. 5 is a schematic diagram of the alarm mode latching relay means and audio alarm system.

Referring now to FIG. 5, the receiver 4 can be of standard AM or FM design and is modified in the following manner, audio output of the receiver 14 is connected to the volume control high side indicated by reference character 45 through the relay means 28 in a manner that will be hereinafter set forth. The volume control for the receiver is shown as a potentiometer 48 having the volume high side 45 of the potentiometer connected to the relay means 28 and also to the input of the state variable active filter 18 for a purpose that will be hereinafter set forth.

Figure 3:
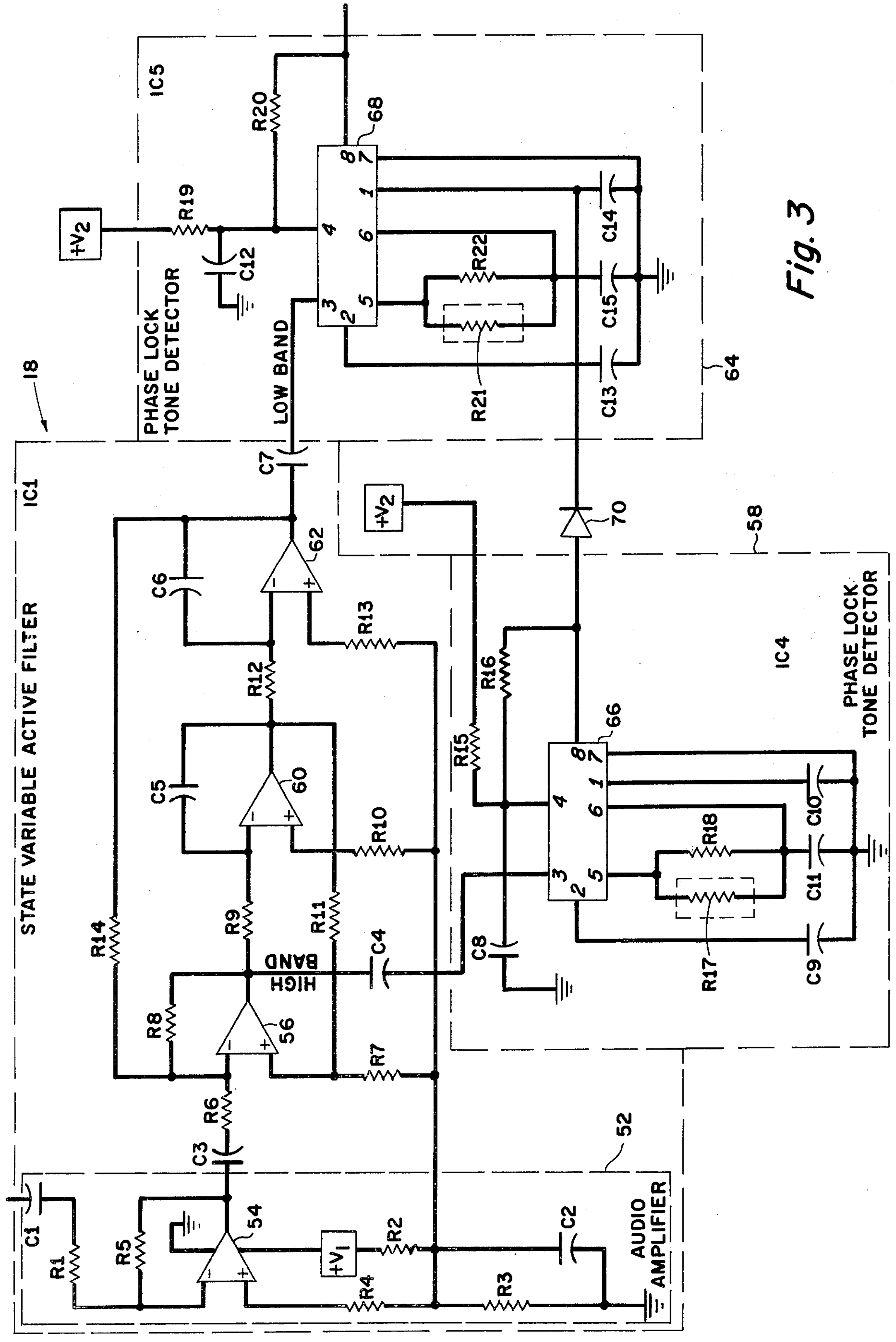
FIG. 3 is a schematic diagram of the decoded portion of the alarm system.

The output of the high side 45 of the volume control 48 is connected to the ordinary receiver output amplifier and speaker 50 through the potentiometer and volume control center tap 46. Referring to FIG. 3, the state variable active filter 18 is provided with an audio amplifier 52 which comprises an operational amplifier 54 having its input connected to the audio output of the receiver through the resistor R1 and capacitor C1 in series therewith. DC power from + V1 is also applied to the operational amplifier 54 directly and also applied to the second input of the operational amplifier 54 through the voltage divider made up of resistors R2 and R3.

A load resistor R4 is connected between the said voltage divider and the second input of the operational amplifier 54. The juncture between the voltage divider resistors R2 and R3 are connected to ground through a capacitor C2. The output of the operational amplifier 54 is then connected back to the input through a resistor R5.

The output of the audio amplifier 52 is then connected to the input of a plurality of operational amplifiers connected as a state variable active filter. The first operational amplifier of the state variable active filter is designated by reference character 56 and receives its input from the output of the audio amplifier 52 through a capacitor C3 and resistor R6 in series therewith. The second input of the operation amplifier 56 is connected to voltage + V1 through resistor R7 and the previously described resistor R2. The output of the operational amplifier 56 is connected back to its first input through a resistor R8.

The output of the operational amplifier 56 is also connected to the input of a first phase lock tone detector 58 through a capacitor C4. The output of the operational amplifier 56 is also connected to a first input of an operational amplifier 60 through a resistor R9. The second input of the operational amplifier 60 is connected to power V1 through a resistor R10 and the previously described resistor R2. The output of the operational amplifier 60 is connected to its first input through a capacitor C5 and is connected to the second input of the operational amplifier 56 through a resistor R11.

The output of the operational amplifier 60 is also connected to a first input of an operational amplifier 62 through a resistor R12, the second input of the operational amplifier 62 being connected to voltage through a resistor R13 and the previously mentioned resistor R2. The output of the operational amplifier 62 is connected back to its first input through a capacitor C6. The output of the operational amplifier 62 is also connected back to the first input of the operational amplifier 56 through a resistor R14. The output of the operational amplifier 62 is also connected to the input of a second phase lock tone detector 64 through a capacitor C7.

Although reference character 56, 60 and 62 are in fact operational amplifiers, they are connected as a state variable active filter in such a way that the output of operational amplifier 56 represents the high band of an audio tone which is provided as an input to the phase lock tone detector 58. Likewise, the output of the operational amplifier 62 provides a low band audio tone as an input to the second phase lock tone detector 64. It has been found that the audio amplifier and the state variable active filter may be constructed from an off-to-shelf quad operational amplifier integrated circuit which is designated herein as IC1.

The first phase lock tone detector 58 as hereinbefore set forth receives its high band audio tone from the output of the state variable active filter into an off-the-shelf purchaseable chip designated by reference character 66. The input is received at pin 3 of the chip 66.

Power is provided to pin 4 the phase lock tone detector 58 from + V2 through a voltage divider made up of resistors R15 and R16. Capacitors C9 and C10 connect pins 2 and 1 respectively to ground and serve as filters for setting response time for the phase lock tone detector. Pin 5 is connected to ground through parallel resistors R17 and R18 and capacitor C11 all of which may be adjusted to set the operational frequency of the phase lock tone detector.

When the proper frequency is provided at pin 3 of the phase lock tone detector 58, the output voltage at pin 8 thereof goes low. When the proper frequency is not provided at pin 3, the output voltage of pin 8 is positive. The second phase lock tone detector 64 is substantially identical to the detector 58 and utilizes a chip 68. The chip 68 accepts its input frequency from the output of the state variable action filter operational amplifiers 2 through the capacitor C7 to pin 3. Voltage is provided at pin 4 of the detector 68 from + V2 through the voltage divider made up of resistors R19 and R20, pin 4 also being connected to ground through the capacitor C12. Again pins 2 and 1 of the detector chip 68 are connected to ground through the capacitors C13 and C14 respectively and may be adjusted in value to set the response time for the detector 64. Pin 5 of the detector chip 68 is connected to ground through parallel resistors R21 and R22 and the capacitor C15, all of which may be adjusted to set the operational frequency of the detector 64. The output of pin 8 of the detector chip 66 is connected to pin 1 of the detector chip 68 through a normally forward biased diode 70. So long as there is a positive output from pin 8, of the chip 66, the diode 70 is forward biased and provided a positive voltage at pin 1 of the chip 68. This positive voltage of pin 1 of the chip 68 serves to lock the tone detector in an off mode or such that the output at pin 8 of the chip 68 is high or positive regardless of whether or not there is a signal present at pin 3 of the chip 68.

However, if there is a signal present in pin 3 of chip 68 and in pin 3 of chip 66, the output of pin 8 of chip 66 will go low, thereby reverse biasing the diode 17 which removes positive voltage from pin 1 of chips 8. In that particular situation, and only in that situation will the phase lock tone detector 64 turn on permitting the output pin 8 thereof go low or near 0 voltage.

Figure 4:
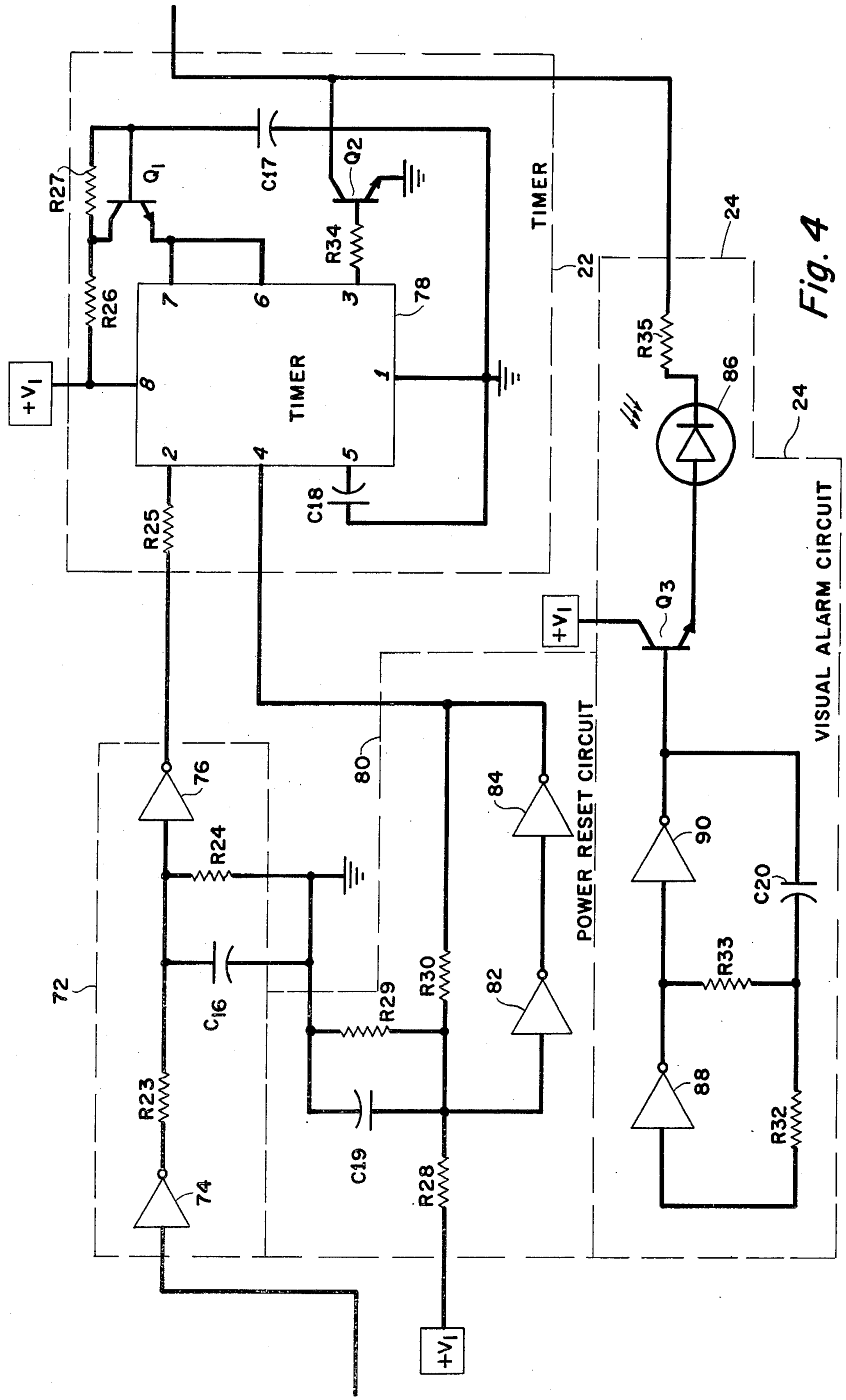
FIG. 4 is a schematic diagram of the timer means and visual alarm of the alarm system.

The output at pin 8 is connected to the input of a delay network identified by reference character 72 of FIG. 4. The circuit 72 is provided with a first invertor 74 the output of which is connected to one side of a resistor R23. The opposite side of the resistor R23 is then connected to the ground through the capacitor C16 and parallel resistor R24. The second side of the resistor R23 is also connected as the input to a second invertor 76. The output of the invertor 76 is then connected to the input of the timer means 22 through the resistor R25. Therefore, when there is a low output voltage from pin 8 of the chip 68 of the phase lock tone detector 64, the low voltage is inverted by the invertor 74 to a positive voltage output which begins charging the capacitor C16. When the charge on the capacitor C16 reaches a predetermined threshold level, the positive signal travels through the invertor 76 and is inverted to a low signal which provides a starting impulse through the resistor R25 to the timer 22. Therefore, by adjusting the RC circuit of the delay circuit 72, a time delay is provided for a purpose which will be hereinafter set forth.

The timer circuit 22 comprises a purchaseable timer integrated circuit chip 78. The terminals are indicated by characters 1 through 8, the input terminal being pin 2. Pin 2 which is connected to the output of the delay mechanism 72 through the resistor R25. Voltage from V1 is applied to pin 8 of the chip 78 and ground is provided through pin 1. Pins 6 and 7 of chip 78 are connected to the emitter of a transistor Q1. The base of the transistor Q1 is connected to ground through a capacitor C17 which is designed to set the run time of the timer chip 78. The collector of the transistor Q1 is connected to voltage + V1 through the resistor R26 and to the base of the transistor through the resistor 27. Pin 5 of the timer chip 78 is connected to ground through a capacitor C18. The transistor Q1 and associated circuitry constitutes a beta multiplication circuit which is added to the reference capacitor C17 wherein the gain or beta of the transistor Q1 serves to effectively isolate the timing capacitor C17 from the time chip 78. The advantage of this circuit is that an inexpensive capacitor C17, which will have a high rate of leakage, can be used to generate long time delays without disabling the time chip 78. For instance, for a typical timer integrated circuit such as the 555 type, normal time delays are usually a maximum of 30 minutes using ordinary grade capacitors. With the beta multiplication circuit hereinbefore described, ordinary capacitors can be used to generate time delays in the range of 6 hours.

Pin 4 of the timer chip is a reset terminal which will stop and reset the timer providing a low of 0 voltage signal is applied in pin 4. A power reset circuit 80 is connected directly to the reset terminal 4 of the timer chip 78. The power reset circuit 80 comprises a pair of series connected invertors 82 and 84, the output of the invertor 84 being connected to the timer reset terminal with the input of the invertor 82 being connected to power + V1 through a voltage divider made up of resistors R28 and R29. Coupled with the resistors R28 and R29 is a circuit made up of capacitor C19 and resistor R30. The power reset circuit will serve to reset the timer in case of power failure. This occurs when the power comes back on in a normal manner.

When the power is initially applied to + V1, this initial pulse power travels directly across the capacitor C19 thereby causing the input of the invertor 82 to be low or negative for that short pulse time. The output of invertor 82 provides a positive input to invertor 84. The output of invertor 84 goes negative which is provided directly to the timer reset terminal pin 4 which resets the timer and stops the timer if it is running. However, while power is on, the capacitor C19 will be charged and a positive voltage will occur between the voltage divider resistors R28 and R29 thereby applying the positive input voltage to the input of the invertor 82 which provides a positive voltage to pin 4 of the timer for normal operation.

Referring now to FIG. 5, a relay means 28 comprises a pair of relays the operators of which are identified by reference characters K1 and K2. Both relays K1 and K2 are operated double pole double throw relays. The operator of the relay K1 is connected to the output pin 3 of timer chip 78 through a transistor driver Q2 and current limiting resistor R34 (FIG. 4). The relay operator K1 has its positive side connected directly to positive voltage V1.

Referring now to the visual alarm circuit 24 of FIG. 4, it is seen that the visual alarm system comprises the light emitting diode LED 86 which is connected to a negative power source or ground through a resistor R35 and the transistor Q2. The positive source for the LED is provided through a transistor Q3 having its collector connected to voltage V1 and its emitter connected to the positive side of the LED 86. The base of the transistor Q3 is connected to the output of a low frequency oscillator which is made up of a pair of series connected inverters 88 and 90. The period of oscillation is controlled by an RC network comprising resistors R32 and R33 and the capacitor C20. The purpose of Q3 is to provide a positive source for the anode of LED 86 each time the base goes positive due to the oscillator action of the invertors 88 and 90.

The first pole of K1 is designated by reference character 92. The pole is connected directly to the audio output amplifier and speaker 50 for the receiver 14. The second pole 94 is connected to the user AC power input. The contacts from pole 92 are designated *92a* for the normal position and **92*b* for the thrown position. The contacts for pole 94 are designated 94*a* for the normal position and 94*b* for the thrown position. The first and second poles for the relay K2 are indicated by reference character 96 and 98. The contacts for pole 96 are designated as 96*a* for the normal position and 96*b* for the thrown position. The contacts for the pole 98 are designated 98*a* for the normal position and 98*b*** for the thrown position.

The contact **94*a* of the relay K1 is connected to the users normal electrical equipment or full use of electrical power. The contact 94*b* is connected to the user's peak load equipment which may normally consist of a dual rate meter and/or a reduced amount of electrical equipment to be used and is generally indicated in FIG. 1 by reference character 30. It is further obvious that where a low power relay is used for K1, pole 94 and contacts 94*a* and 94*b* would be used for operating a power relay as opposed to carrying the power load itself. Contact 92*a* of the relay K1 is connected to contact 98*b* of the relay K2 and also to the volume control center tap 46 of the receiver 14. The contact 92*b* of the relay K1 is connected to pole 98 of the relay K2. Contact 96*a* of the relay K2 is disconnected and contact 96*b* of the relay K2 is connected to the negative side of the relay solenoid K2 is also connected to ground through a momentary reset switch indicated by reference character 100 and the transistor Q2. The reset switch 100 may be located on the receiver or at least exterior of the equipment. The reset switch 100** is manually operated and may be a simple spring loaded normally-open switch and may be closed momentarily for a purpose that will be hereinafter set forth.

Resistor R34 is current limiting for Q2. Q2 will not conduct until the timer is on, at which time a high will appear on pin 3 which will turn Q2 on. With the emitter of Q2 tied to negative, K1 (FIG. 5) will energize. Also with Q2 turned on, K2 would energize if the reset switch was momentarily depressed and K2 would remain energized for the timer "on" duration.

Contact **98*a* of the relay K2 is connected to the volume high side of the volume control 48 of the receiver which is likewise connected to the signal audio output of the receiver and to the input of the audio amplifier 52. As hereinbefore set forth, the contact 98*b* is connected to contact 92*a* of the relay K1 and also to the volume control center tap 46 of the receiver 14**.

During normal use and when a peak load condition is not in effect, normal broadcast signals from the broadcast station 12 will be received via the antenna 16 of the receiver 14. This incoming broadcast signal is processed by the receiver components (not shown) and presented constantly to the alarm system audio amplifier 52 and likewise is connected to the volume high side of the receiver volume control 48. The signal travels through the potentiometer of the volume control 48 and through the center tap 46 thereof, the signal travelling then through contact **92*a* of the relay K1, through the pole 92 and directly to the receiver outut amplifier and speaker 50. During this time AC power for the user's facility is received through centerpole 94 of the relay K1 and to the user's normal meter and equipment through contact 94*a*** thereof.

When a peak load condition arises, the power distribution company will notify the broadcast station whereby a prerecorded message preceded by a coded tone may be broadcast to be received by the receiver 14. This tone is normally in the form of a mixed dual tone which is received by the audio amplifier 52, and provide, both the high and low band frequencies are present, the state variable active filters will transmit the high band signal from the output of the operational amplifier 56 through the capacitor C4 to input 3 of the phase lock tone detector 58. Simultaneously, the low band signal will be present on the output of the operational amplifier 62 of the state variable active filter and will pass through the capacitor C7 and be present at the pin 3 of the phase lock tone detector 64. As hereinbefore set forth, the phase lock tone detector 64 will be held out of operation by the enabling diode 70 until a high band signal is present at the phase lock tone detector 58. When both tones are available however the enabling diode 70 will be reversed biased and a zero voltage or low output signal will be present at pin 8 of the phase lock tone detector 64.

This negative output signal passes to the delay circuits 72. The low signal passes through the invertor 74, is inverted to a positive signal and begins charging the capacitor C16 thereof. After the capacitor C16 has reached a full charge, or a threshold level, the signal is again inverted by the invertor 76 and passes through the resistor R25 into the starting pin 2 of the timer chip 78. It is noted that if the dual tone is not present long enough for the capacitor C16 to reach full charge or reach a threshold condition, the phase lock tone detector will unlock thereby stopping the signal from starting the timer chip 78. Whereas, there may be many audio signals which would tend to trigger the phase lock tone detectors 58 and 64, it is noted that both tones must be present at the phase lock tone detectors for a preset duration of time before the signal is passed onto the timer 22 to start operation thereof.

Once the appropriate signal has been received starting the timer 78, the timer will begin running its full time cycle which is set by the capacitor C17 and the isolating transistor Q1. When the timer is on, a positive output voltage is present on pin 3 of the timer which turns on Q2 thereby providing a negative or ground for LED 86 through the current limiting resistor R35. Although Q3 will be constantly gating on and off, the LED will blink only when the timer is on.

It is seen when the pole 92 is connected to **92*b*, the input signal received by the receiver will travel through contact 98*a*, pole 98, through contact 92*b*, through pole 92 and directly to receiver audio amplifier and speaker 50. Therefore, the incoming broadcast signal bypasses the volume control 48 and the amplifier and speakers 50 thereof go to full volume. At this time, the broadcast station 12 may broadcast a prerecorded signal for message advising the user of a peak load condition and asking for the user to voluntarily turn off nonessential electrical equipment. It can also be seen that the pole 94 of the relay K1 will be connected to contact 94*b*** which may be connected to a dual rate meter or may even be connected to automatically drop out nonessential electrical equipment of the user.

The user, at this point, in order to restore volume control to his receiver, may press the reset switch 100 which will provide a ground for the solenoid of relay K2 through transistor Q2 providing there is an output voltage at pin 3 of the timer chip 78 sufficient to turn on Q2 thereby switching the poles 96 and 98 to contacts **96*b* and 98*b* respectively. It can be seen when the pole 96 is connected to contact 96*b*, relay K2 is latched in a thrown position and the reset switch 100 may be released leaving the relay K2 latched in said thrown position. It can likewise be seen that when pole 98 is connected to 98*b*, the audio input for the receiver is again caused to pass through the volume control potentiometer 48, the center tap 46 thereof, contact 98*b*, pole 98, contact 92*b*, pole 92 and directly to the audio output amplifier and speaker 50 of the receiver 14**.

After the timer 22 has run its entire cycle, it will automatically switch power off of the output pin 3 thereof which removes power to the relays K1 and K2 causing them to switch back to their normal operating condition as shown in FIG. 5.

It is also noted as hereinbefore set forth that in the case of an AC power failure, the power would be removed from the power supply circuit 32 which upon resumption will produce a power reset output signal from the reset circuit 80 to pin 4 of the timer to reset the timer in order to prevent inadvertent starting of the timer due to a power failure condition.

From the foregoing, it is apparent that the present invention provides a peak load alarm system which is utilized in conjunction with a modified AM or FM radio receiver which not only provides special alarm capabilities but also can provide actual switching to reduce power consumption or to meter the power consumption at a different scale.

Whereas, the present invention has been described in particular relation to the drawings attached hereto, other and further modifications apart from those shown or suggested herein may be made within the spirit and scope of the invention.

What is claimed is:

1. A peak load alarm system comprising;
(a) a radio receiver operably connected to the user's AC power source capable of receiving radio broadcast audio signals, said radio receiver being equipped with an audio amplifier and speaker and volume control means,
(b) a tone decoder operably connected to the receiver audio output for detecting a coded tone alarm transmission said tone decoder comprising at least two phase lock loop circuits for simultaneously detecting a separate tone frequency for each said phase lock loop circuit;
(c) a timer means operably connected to the output of the tone decoder for initiation by said tone decoder output; and
(d) audio alarm means operably connected between the timer means and the radio receiver speaker for providing full speaker volume while the timer is running said full speaker volume constituting said audio alarm.

2. A peak load alarm system as set forth in claim 1 wherein the radio receiver is fixed tuned to a cooperating broadcast station.

3. A peak load alarm system as set forth in claim 2 wherein the radio receiver is amplitude modulated.

4. A peak load alarm system as set forth in claim 2 wherein the radio receiver is frequency modulated.

5. A peak load alarm system as set forth in claim 1 wherein the tone decoder comprises a state variable active filter to separate multiple tone frequencies, a separate phase lock tone detector operably connected to each filter output, enabler means operably connected between the tone detectors whereby the audio alarm tone must be present at all filter outputs simultaneously before initiation of the tone decoder output, and time delay means operably connected between the tone decoder output in the timer means input whereby the proper coded tone signal must be present at all tone decoders for a time delay means interval before the tone decoder output is passed to the timer means.

6. A peak load alarm system as set forth in claim 1 wherein the timer means comprises a replaceable timing capacitor for setting desired time duration and includes a beta multiplication circuit to isolate the timing capacitor for the timer in order to obtain extended time durations.

7. A peak load alarm system as set forth in claim 1 wherein the timer means includes a reset function, and includes a power reset circuit operably connected between the power source and the timer reset function for resetting the timer at the end of a power interruption for the prevention of false triggering of the timer means.

8. A peak load alarm system as set forth in claim 1 wherein an audio alarm means comprises relay having an operator, said operator being connected to the output of the timer means, said relay having contacts being connected to the radio receiver audio output and the receiver volume control, one pole of said relay being connected to the receiver audio amplifier and speaker 50 whereby in a normal position, received audio signals will be passed through the volume control before entering the receiver audio amplifier and speaker and in a thrown position, said audio output signal being transmitted directly to the receiver audio amplifier and speaker thereby bypassing the receiver volume control, whereby when the timer means is not running, the receiver volume control is in effect and when the timer is running the receiver is at full volume.

9. A peak load alarm system as set forth in claim 8 wherein the relay means comprises volume control reset means operably connected to the contacts of said relay means and including latching means whereby upon reset activation, the said relay pole is reconnected to the volume control means to restore volume control while the timer means is running.

10. A peak load alarm system as set forth in claim 9 wherein said relay means comprises a second pole operably connected to the electrical power source, a pair of associated contacts, one being connected to a first set of electrical equipment, the second connected to a second peak load set of equipment, whereby when timer is not running, the first set of equipment is connected to the electrical power source and when the timer is running the second set of equipment is connected to the electrical power source.

11. A peak load alarm system as set forth in claim 10 wherein the said first set of equipment includes a first power use meter and the second set of equipment includes a second power use meter.

12. A peak load alarm system as set forth in claim 10 wherein the first set of electrical equipment includes all user electrical equipment and the second set of equipment includes only a selected portion thereof.

13. A peak load alarm system comprising:
(a) a radio receiver;
(b) a tone decoder operably connected to the radio receiver, said tone decoder comprising means for detecting and separating two separate tones of different frequency simultaneously and enabler means operably connected between said means for detecting such that output from the tone decoder is withheld until said separate tones are received simultaneously;

(c) a timer operably connected to the output of the tone decoder for initiaton by said tone decoder output, and;

(d) audio and visual alarm means operably connected to the timer means providing audio and visual alarm while the timer is running.

14. A peak load alarm system as set forth in claim 13 wherein the visual alarm comprises a long period oscillator circuit, and a light emission means operably connected between the oscillator circuit and the timer output for causing a flashing operation of said light emission means.

* * * * *